United States Patent [19]

Matles

[11] Patent Number: 4,826,413

[45] Date of Patent: May 2, 1989

[54] APPARATUS FOR REPAIR OF SHATTERPROOF GLASS

[75] Inventor: William B. Matles, Philadelphia, Pa.

[73] Assignee: Glass Medic, Inc., Hatfield, Pa.

[21] Appl. No.: 153,784

[22] Filed: Feb. 8, 1988

[51] Int. Cl.⁴ .................. B32B 35/00; B29C 67/10
[52] U.S. Cl. ............................. 425/12; 156/94; 264/36; 425/13
[58] Field of Search .................... 425/11–13, 425/546; 264/36; 156/94, 382

[56] References Cited

U.S. PATENT DOCUMENTS

| | | | |
|---|---|---|---|
| 4,047,863 | 9/1977 | McCluskey et al. | 425/13 |
| 4,249,869 | 2/1981 | Petersen | 425/12 |
| 4,385,015 | 5/1983 | Klettke | 264/36 |
| 4,419,305 | 12/1983 | Matles | 264/36 |
| 4,597,727 | 7/1986 | Birkhauser, III | 425/12 |
| 4,681,520 | 7/1987 | Birkhauser, III | 425/12 |
| 4,744,841 | 5/1988 | Thomas | 264/36 |

Primary Examiner—Jay H. Woo
Assistant Examiner—James C. Housel
Attorney, Agent, or Firm—Ferrill and Logan

[57] ABSTRACT

The present invention provided improved apparatus and method of repairing conical cracks in shatterproof glass which are located close to the edge of the glass. Employing known vacuum repair apparatus, the invention uses a second, smaller, vacuum cup which is placed in fluid communication with the known apparatus. The invention utilizes all the full-sized advantages of existing apparatus while permitting repair of cracks located quite near the edge of the glass.

11 Claims, 2 Drawing Sheets

APPARATUS FOR REPAIR OF SHATTERPROOF GLASS

BACKGROUND OF THE INVENTION

1. Field of the Invention

The present invention relates to repair of shatterproof glass laminates of the type used in automobile windshields. Particularly, the present invention provides an improvement in an apparatus and method for repairing conical cracks through use of a chemical repair liquid.

2. Description of the Prior Art

It is well known that when a stone or other small object strikes a piece of shatterproof glass, a small cone-shaped piece of glass often separates from one the the glass laminates. The separated piece of glass usually remains embedded in the glass and leaves a conical crack or pock-mark in the glass. Left unattended those cracks often increase in size and, even if they become no worse, such cracks have traditionally required replacement of the entire piece of glass.

Development of a glass repair liquid with a finished index of refraction very close to that of glass is spurred development of many devices and methods for applying such liquid to conical cracks to repair windshields and other damaged shatterproof glasses. Two such devices and methods are disclosed in U.S. Pats. Nos. 4,047,863 issued to McCluskey et al. on Sept. 13, 1977, and 4,419,305 issued to Matles on Dec. 6, 1983.

Although these devices function extremely well for most repairs, it has been found that the size of the apparatus bars repair of cracks which are located so close to the edge of the glass that the vacuum chamber apparatus cannot be centered over the damaged area. In such cases, the only repair that presently can be effected is to replace the entire glass.

Attempts to decrease the size of the vacuum chamber have presented a host of problems. The smaller vacuum chambers are more difficult to handle, orient and attach to a windshield. Additionally, the smaller chambers do not generate sufficient suction alone to hold all the apparatus needed to repair the glass, including the vacuum release valve and the glass repair liquid delivery apparatus. Moreover, many feel the limited uses of such down-sized equipment do not warrant substitution over the very effective full size vacuum chambers or the additional expense of having two repair apparatus.

Accordingly, it is a primary object of the present invention to provide an apparatus and method of repairing conical cracks located near the edge or other inaccesible areas of shatterproof glass.

It is a further object of the present invention to provide an apparatus and method of repairing such glass damage which is easily handled, oriented, and attached to the glass to be repaired.

It is an additional object of the present invention to provide an apparatus and method of repairing such glass damage which employs primarily existing equipment, thus limiting additional investment costs while achieving the benefits of the present invention.

SUMMARY OF THE INVENTION

The present invention provides apparatus and method for repairing conical cracks or "pock marks" in shatterproof glass which are located too close to the edge of the glass.

The present invention employs a known vacuum cup, vacuum pump and vacuum cut-off valve apparatus for degassing and applying glass repair liquid. The invention provides a second vacuum cut of smaller size which is attached to, and in fluid communication with, the first vacuum cup. The smaller cup is adapted to receive the same glass repair liquid delivery apparatus as the full-sized vacuum cup, but it requires a much smaller area of the glass in which to operate.

The advantage of the present invention are manifold. The smaller vacuum cup uses the larger cup as an anchoring means, thus producing a sufficient vacuum grip on the glass to allow the second cup to be of minimum size while still employing full-sized glass repair liquid delivery apparatus. The anchorage of the full-sized cup also permits use of an accessible vacuum cut off valve, which is very useful in both centering the repair apparatus and in performing the repairs. Finally, employing known repair apparatus, the present invention requires minimum additional capital investment.

DETAILED DESCRIPTION OF THE INVENTION

The present invention provides an improved apparatus and method for repairing shatterproof or safety glass such as that used as automobile windshields.

Figure 1:
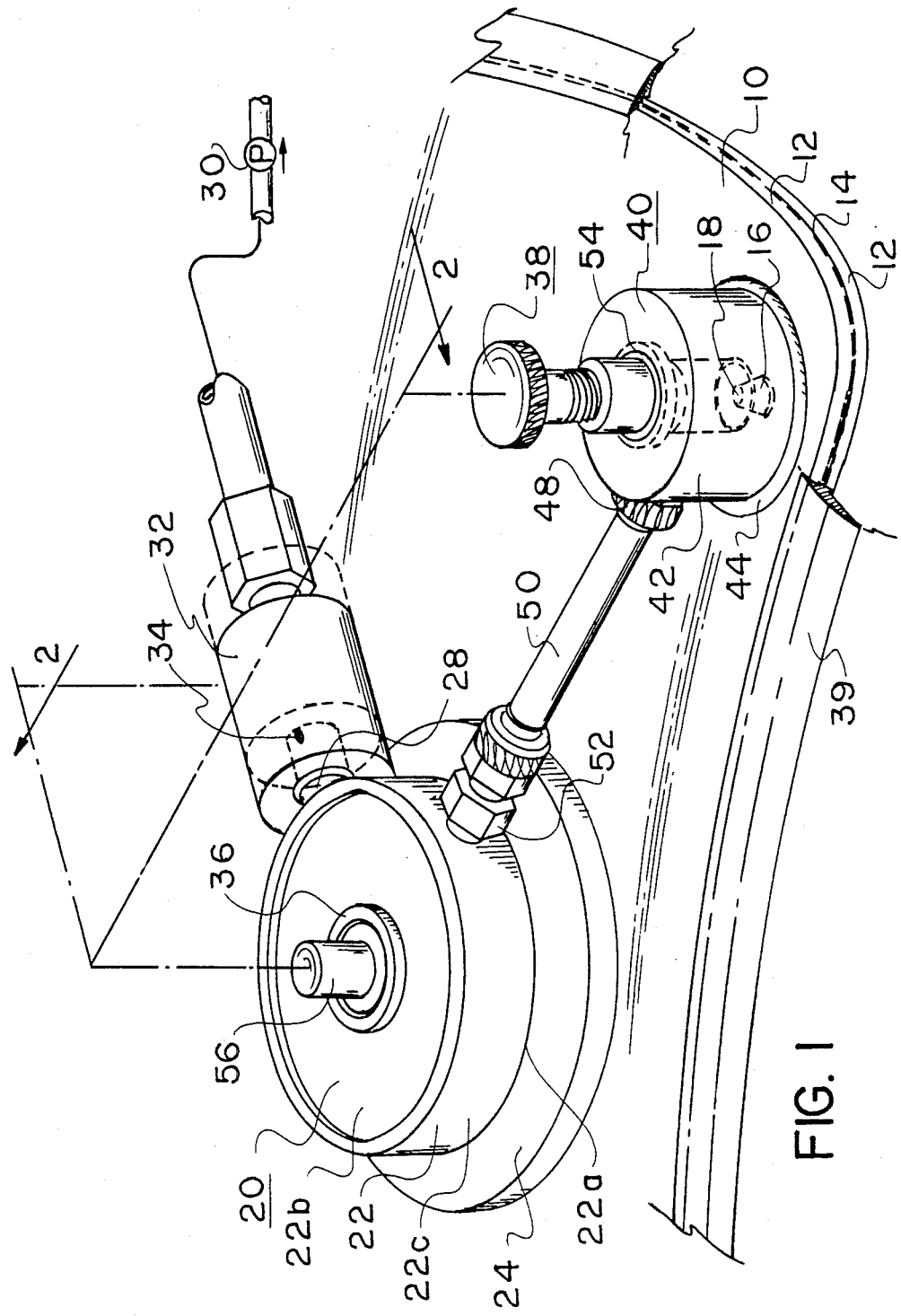
FIG. 1 is a perspective view of the apparatus of the present invention positioned over a damaged area near the edge of a windshield.

Shown in FIG. 1 is a section of shatterproof glass 10. Such glass 10 is usually composed of two layers of glass lamination 12 sandwiching a layer of plastic film 14. When a small stone or other object strikes the glass 10, often a separated conical plug 16 of glass will be formed in one of the layers of glass lamination 16 at the point of impact 18.

As is known, polymerization liquid having a finished index of refraction nearly identical to that of shatterproof glass is available to effect repairs of such damage. One such available liquid comprises seven parts by weight of polyester acrylic resin mixture, three parts by weight of methyl methacrylate, 0.03 parts by weight of benzoyl peroxide, 0.15 parts by weight of benzoin, and 0.025 parts by weight vinyl methoxysilane. Another acceptable liquid is sold under the name Glass Repair Formula PC17G and is available from SNG Laboratories, Inc., P.O. Box 383, Fort Washington, Pa.

As is discussed in U.S. Pat. No. 4,047,863, it has been found that application of the fluid under vacuum conditions evacuates the crack and the liquid of contaminating air bubbles. By releasing the vacuum after application, atmospheric pressure forces the liquid to surround the plug 16 fully and produce an exceptional repair.

Figure 2:
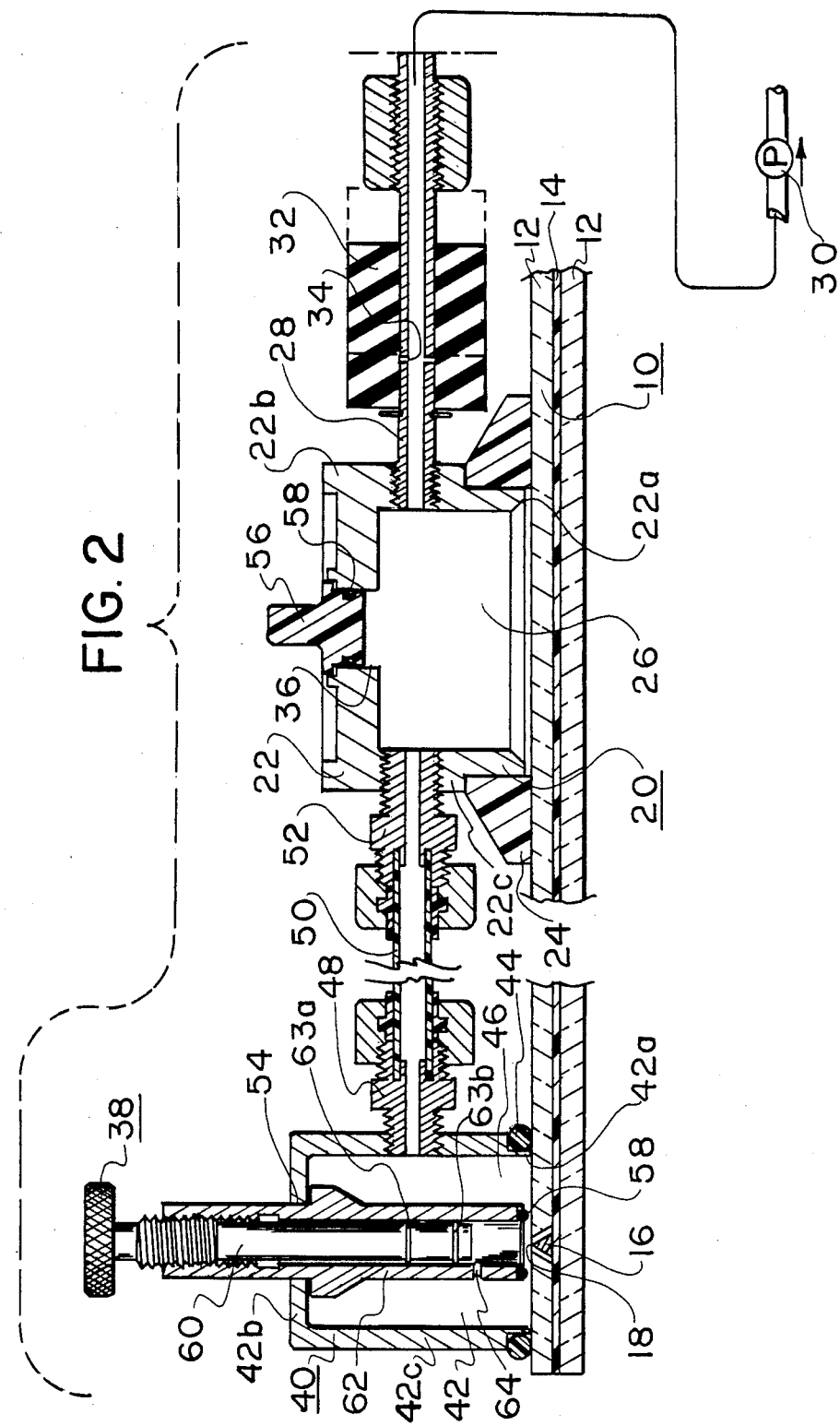
FIG. 2 is a section view of the present invention along line 2—2 of FIG. 1.

FIGS. 1 and 2 show a first vacuum cup 20 very similar to the one disclosed in U.S. Pat. No. 4,047,863. The first cup 20 comprises a cylindrical chamber 22, having an open end 22a, a closed end 22b, and a side wall 22c, and a rubber or plastic seal 24, which cooperate against the glass 10 to create within cup 20 a first enclosure 26. Communicating with the first enclosure 26 is a fitting 28. The fitting 28 attaches to a vacuum pump 30, or other means to evacuate the first enclosure. A manually slidable valve 32 is provided controlling communication through air passages 34 between the first enclosure 26 and atmospheric air. An opening 36 in the closed end 22b of the cup 20, opposing the glass 10, is adapted to receive a glass repair liquid dispensing plunger and cylinder assembly 38 and create an airtight seal around the assembly 38. Rubber cement or silicon sealer placed between the assembly 38 and opening 36 assures a proper seal.

Although this apparatus functions very well in delivering glass repair liquid to most damaged areas and repairing most conical cracks 16, it has proven too large to service certain somewhat inaccessible cracks 16, such as cracks 16 which are located close to an edge of the glass 10, too close to glass retaining molding 39, or in other areas where the first cup 20 cannot be properly centered over the crack 16. It is for precisely these instances that the present invention was developed.

In the present invention, a second vacuum cup 40 has been provied which comprises a smaller cylindrical chamber 42, having an open end 42a, a closed end 42b, and a side wall 42c, and a rubber or plastic O-ring 44, which cooperate against the glass 10 to create within cup 40 a second enclosure 46. Communicating with the second enclosure 46 is a fitting 48. The fitting 48 attaches to a flexible tubular connector 50 which in turn attaches to a fitting 52 in cup 20. Fittings 48 and 52 and the connector 50 provide fluid communication between the first enclosure 26 and the second enclosure 46.

An opening 54 in cup 40, resembling opening 38 in dimensions and function, is provided to receive the glass repair liquid dispensing plunger and cylinder assembly 38 and create an airtight seal around the assembly 38. Again, rubber cement or other sealer may be used to assure an airtight connection between the assembly 38 and the opening 54. When the second cup 40 is employed to repair a crack 16, a plug 56 with a sealing O-ring 58 may be substituted for the assembly 38 in cup 20 and inserted into opening 36 to maintain the airtightness of cup 20.

The operation of the present invention is very similar to that disclosed in U.S. Pat. No. 4,385,015. The cylinder 38 extends from the closed end 42b of the cup 40 to the open end 42a of the cup 20, and is thee provided with a seal 58 positioned to engage the face of the glass 10 and isolate the enclosure 46 into two separate volumes, one being inside the assembly 38, and the other being within the cup 42 but outside the assembly 38. The plunger 60 is threaded into the cylinder 62 of the assembly 38, and is removable so that repair liquid can be introduced into the cylinder 62. The cylinder 62 itself acts as a dam or reservoir, holding a small quantity of repair liquid against the face of the glass 10. The plunger 60 is in sealing relationship with the interior wall of the cylinder, using O-rings 63a and 63b. The plunger 60 is capable of forcing the liquid into the crack 16 as the plunger 60 is threaded toward the crack 16. A transverse hole 64 is provided in the cylinder 62 a short distance away from the sealing means 58 at the end of the assembly 38. This transverse hole 64 provides fluid communication between the volume within the assembly 38 and the volume within the cup 42 but outside the assembly 38 when the plunger 60 is retracted.

In operation, the cup 42 is placed over the area to be repaired so that the impact point 18 is centered underneath the end of the assembly 38. Cup 20 is positioned to maintain cup 40 in this orientation. Repair liquid is introduced into the opposite end of the cylinder 62, and the plunger 60 is threaded partway into the cylinder, but not so far as to cut off fluid communication through the transverse hole 64. A vacuum is then drawn on the interior of the cup by a continuous vacuum pump 30. The vacuum serves to hold cups 20 and 40 in the proper orientation against the glass 10. Because the transverse hole 64 is open, a vacuum is simultaneously drawn on the interior of the cylinder 62, and the effect of the vacuum is to remove dissolved gas from the repair liquid. The vacuum is maintained for a period of time sufficient to effect substantially complete degasing of the repair liquid within cylinder 62. The time required depends on the amount of dissolved gas and also upon the viscosity of the repair liquid. Several minutes may be required before complete degasing takes place.

The amount of repair liquid injected into the cylinder 62 should be carefully controlled. Transverse hole 64 is preferably positioned so that, as the plunger 60 moves toward the end of the cylinder 62, and O-ring 63b approaches transverse hole 64, the liquid is not forced out of hole 64. However, transverse hole 64 should not be positioned so far away from the end of the cylinder 62 that a substantial quantity of gas is trapped and redissolved in the repair liquid as the plunger 60 moves inwardly after fluid communication through hole 64 is cut off by O-ring 63b.

As the piston moves forward, it forces repair liquid into the conical crack. Care should be exercised to avoid excessive fluid pressure which may cause an irreparable "daisy" effect on the glass. When sufficient quantity of liquid has been introduced into the crack 16, the vacuum is shut off using valve 32. The two cups 20 and 40 can then be removed from the glass 10 so that curing of the repair liquid and final finishing of the repair can take place using conventional methods.

The present invention provides repair of conical cracks 16 which otherwise would in inaccessible to full sized vacuum repair apparatus. However, the down sizing of the apparatus does not sacrifice any of the advantages of the full sized apparatus, such as a full vacuum restraint on the glass surface, ease in positioning and operation, use of full sized glass repair liquid delivery apparatus, and an accessible vacuum cut-off valve. Moreover, the present invention can be readily adapted for use with conventional equipment, thus providing the benefits of the present invention with limited additional investment. An air-tight plug (not shown) can be readily attached to fitting 52 to allow removal of the cup 40 and the tubular connector 50 and permit cup 20 to be used alone on conventionally accessible repairs.

While particular embodiments of the present invention have been disclosed herein, it is not intended to limit the invention to such disclosure and changes and modifications may be incorporated and embodied within the scope of the following claims.

What is claimed is:

1. In the apparatus for repair of conical cracks in shatterproof glass employing means cooperating with a first area on said glass to provide a first enclosure bounded in part by said first area, means to evacuate said first enclosure, and control means for releasing air into the first enclosure to reduce a vacuum therein, wherein the improvement comprises means cooperating with a separate second area smaller than said first area on said glass to provide a second enclosure bounded in part by said second area, said second enclosure being smaller than said first enclosure and being provided with means to receive means for delivering glass repair liquid;

means to provide fluid communication between the first and second enclosures; and means for delivering glass repair liquid to a crack being received by said receiving means.

2. The apparatus of claim 1 wherein
said first enclosure is provided with means to receive means for delivering glass repair liquid; and
means are provided to seal the means in the first enclosure to receive apparatus for delivering glass repair fluid when the second enclosure is employed to deliver glass repair liquid.

3. The apparatus of claim 2 wherein the fluid communication means is removable from the first enclosure to cease fluid communication between the first and second enclosures when the first enclosure is employed to deliver glass repair liquid.

4. The apparatus of claim 1 wherein the means to provide fluid communication between the first and second enclosures is a flexible tubular connection.

5. The apparatus of claim 3 wherein the means to provide fluid communication between the first and second enclosures is a flexible tubular connection between a first fitting in the first enclosure and a second fitting in the second enclosure.

6. The apparatus of claim 5 wherein the tubular connection is removable and means is provided to seal the first fitting.

7. The apparatus of claim 2 wherein each means to receive apparatus for delivery of glass repair liquid comprises an opening in each enclosure opposing said glass adapted to receive said liquid delivery means to occlude said opening.

8. The apparatus of claim 7 wherein the means to seal the means in the first enclosure to receive said liquid delivery means comprises a plug which is adapted to fit into and occlude said opening.

9. The apparatus of claim 1 wherein said means cooperating with said smaller second area on said glass to provide said second enclosure comprises
a cup, having at least one cylindrical wall, an open end, and a closed end, said closed end opposing the open end and containing an opening adapted to receive said liquid delivery means to occlude said opening;
a fitting in the side wall communicating between the first and second enclosures; and
means on the open end to assist in creating an airtight seal between the open end of the cup and the glass.

10. The apparatus of claim 9 wherein said means to assist in creating an air-tight seal is a resilient band attached to the open end of the cup.

11. The apparatus of claim 1 wherein said control means releasing air into the first enclosure to reduce the vacuum therein comprises
a fitting attached to said first enclosure communicating between said first enclosure and said means to evacuate said first enclosure, said fitting containing a slide valve; and
said slide valve controlling fluid communication between the first enclosure and the surrounding atmosphere.

* * * * *

UNITED STATES PATENT AND TRADEMARK OFFICE
CERTIFICATE OF CORRECTION

PATENT NO. : 4,826,413
DATED : May 2, 1989
INVENTOR(S) : William B. Matles

It is certified that error appears in the above-identified patent and that said Letters Patent is hereby corrected as shown below:

Col. 1, line 23:   "is" should be --has--

Col. 2, line 2:    "cut" should be --cup--

Col. 3, line 41:   "thee" should be --there--

Claim 9, line 8:   "side" should be inserted after --cylindrical--

Signed and Sealed this

Second Day of January, 1990

Attest:

JEFFREY M. SAMUELS

*Attesting Officer*          *Acting Commissioner of Patents and Trademarks*